(12) United States Patent
Nakajima

(10) Patent No.: US 6,513,341 B2
(45) Date of Patent: Feb. 4, 2003

(54) AIR CONDITIONING SYSTEMS AND METHODS FOR VEHICLES

(75) Inventor: Seichi Nakajima, Isesaki (JP)

(73) Assignee: Sanden Corporation, Gunma (JP)

( * ) Notice: Subject to any disclaimer, the term of this patent is extended or adjusted under 35 U.S.C. 154(b) by 0 days.

(21) Appl. No.: 10/137,341

(22) Filed: May 3, 2002

(65) Prior Publication Data
US 2002/0170305 A1 Nov. 21, 2002

(30) Foreign Application Priority Data
May 16, 2001 (JP) ........................................ 2001-146728

(51) Int. Cl.[7] ............................................... E25B 1/00
(52) U.S. Cl. ............................................ 62/228.4; 62/230
(58) Field of Search ................................ 62/228.1, 228.4, 62/230

(56) References Cited

U.S. PATENT DOCUMENTS

| | | | | |
|---|---|---|---|---|
| 4,094,617 A | * | 6/1978 | Shibuya | 62/230 |
| 4,259,845 A | * | 4/1981 | Norbeck | 62/228.4 |
| 4,989,414 A | * | 2/1991 | Murayama et al. | 62/228.4 |
| 5,036,676 A | * | 8/1991 | Dudley | 62/228.4 |
| 5,371,645 A | * | 12/1994 | Mochizuki | 361/22 |
| 5,467,606 A | * | 11/1995 | Sasaki et al. | 165/127 |
| 5,493,868 A | * | 2/1996 | Kikuiri et al. | 62/228.4 |
| 5,506,486 A | * | 4/1996 | Hayashi et al. | 62/228.4 |
| 5,510,688 A | * | 4/1996 | Schwarz | 62/228.4 |
| 5,673,568 A | * | 10/1997 | Isshiki | 62/228.4 |
| 5,764,011 A | * | 6/1998 | Nakae et al. | 62/228.4 |
| 5,771,704 A | * | 6/1998 | Nakajima et al. | 62/228.4 |
| 6,178,760 B1 | * | 1/2001 | Tanaka et al. | 62/154 |
| 6,278,910 B1 | * | 8/2001 | Miura et al. | 318/803 |
| 6,314,750 B1 | * | 11/2001 | Ishikawa et al. | 62/228.1 |

* cited by examiner

Primary Examiner—William E. Tapolcai
Assistant Examiner—Mohammad M. Ali
(74) Attorney, Agent, or Firm—Baker Botts L.L.P.

(57) ABSTRACT

An air conditioning system for a vehicle comprises a compressor, an electric motor for driving the compressor, a device for variably controlling a rotational speed of a drive shaft of the compressor based on a target rotational speed of the drive shaft of the compressor; a device for limiting the rotational speed of the drive shaft of the compressor to less than the target rotational speed of the compressor when a first value of a current detected at the electric motor is greater than or equal to a first predetermined value; and a device for terminating the limiting of the rotational speed of the drive shaft of the compressor when a second value of the detected current is less than a second predetermined value during the limit operation.

15 Claims, 2 Drawing Sheets

AIR CONDITIONING SYSTEMS AND METHODS FOR VEHICLES

BACKGROUND OF THE INVENTION

1. Field of the Invention

The present invention relates generally to air conditioning systems for vehicles. In particular, the present invention relates to air conditioning systems with heat exchangers and motor-driven compressors.

2. Description of Related Art

Known vehicle air conditioning systems may determine a target rotational speed of a drive shaft of an operating compressor in response to an air conditioning load. Specifically, known air conditioning systems may control the rotational speed of the compressor, e.g., a drive shaft of the compressor, by controlling a rotational speed of an electric motor, e.g., a drive shaft of an electric motor, that drives the compressor. Further, known air conditioning systems may control the rotational speed of the electric motor based on the target rotational speed of the operating compressor. Moreover, known air conditioning systems may be operated for cooling or heating.

Nevertheless, in such air conditioning systems, if the electric motor starts to drive the compressor while a condensed, liquid refrigerant is present in a refrigerant pipe of a low pressure side of the air conditioning system, for example, if the air conditioning system is started when an ambient temperature outside is relatively low, e.g., at or below 0° C., damage to the compressor may occur due to intake and compression of liquid refrigerant in the compressor. Moreover, the possibility of an occurrence of such damage may increase when the rotational speed of the drive shaft of the compressor at activation is relatively high.

In order to avoid the foregoing damage to the compressor, in the known air conditioning systems, particularly systems in which a high rotational speed of the compressor drive shaft is established as a target rotational speed with respect to an air conditioning load, the compressor is operated initially at a predetermined drive shaft rotational speed that is lower than the target rotational speed. Subsequently, the initial rotational speed of the compressor at the start of compressor operation is increased gradually toward the target rotational speed of the compressor.

Nevertheless, in such air conditioning systems, by starting the compressor at a drive shaft rotational speed that is lower than the target rotational speed of the compressor to avoid damage to the compressor, the compressor may not reach the target rotational speed as soon after the start of compressor operation as otherwise might occur if the compressor was not activated initially at a lower rotational speed to avoid damage to the compressor. Moreover, an increase in the time of operation of the compressor, e.g., a time of operation of the heating mode or the heating-dehumidifying mode, or the like, may result from the additional time required for the compressor drive shaft to reach the target rotational speed when the compressor is started initially at a drive shaft rotational speed that is lower than the target rotational speed. Further, even if the compressor is activated initially at or near the target rotational speed, the target rotational speed may be unnecessarily low, e.g., if the compressor is started in a heating mode of operation when the ambient, outside temperature is comparatively high, the rotational speed of the compressor may be limited unnecessarily.

SUMMARY OF THE INVENTION

A need has arisen for air conditioning systems for vehicles and methods of employing such air conditioning systems, wherein damage to a compressor, or to components of the air conditioning system, or both, due to compression of a liquid refrigerant may be reduced or eliminated. Moreover, a need has arisen for air conditioning systems for vehicles and methods of employing such air conditioning systems that reduce or eliminate such damage to a compressor while decreasing a time of operation of the compressor, e.g., a heating mode of operation, a heating-dehumidifying mode of operation, or the like, as compared to known air conditioning systems.

According to an embodiment of the present invention, a vehicle air conditioning system comprises a compressor, an electric motor for driving the compressor, means for variably controlling a rotational speed of a drive shaft of the compressor based on a target rotational speed of a drive shaft of the compressor; means for limiting the rotational speed of the drive shaft of the compressor to less than the target rotational speed when a first value of a current detected at the electric motor is greater than or equal to a first predetermined value; and means for terminating the limiting of the rotational speed of the drive shaft of the compressor when a second value of the detected current is less than a second predetermined value.

In a further embodiment of the present invention, a method of controlling an air conditioning system comprising a motor-driven compressor comprises the steps of detecting an electric current at an electric motor, comparing a first value of the detected current to a first predetermined value, and limiting a rotational speed of a drive shaft of the compressor if the first value is greater than or equal to the first predetermined value.

In yet another embodiment of the present invention, an air conditioning system comprises a compressor, an electric motor for driving the compressor, and a control device for regulating a rotational speed of the electric motor, so that a drive shaft of the compressor rotates at a target rotational speed based on an air conditioning load, wherein the control device detects a first value of an electric current at the electric motor and limits the rotational speed of the electric motor if the first value of the detected current is greater than or equal to a first predetermined value, so that the rotational speed of the drive shaft of the compressor remains below the target rotational speed.

Other objects, features, and advantages of embodiments of this invention will be apparent to persons of ordinary skill in the art from the following description of preferred embodiments with reference to the accompanying drawings.

BRIEF DESCRIPTION OF THE DRAWINGS

The invention may be understood more readily by reference to the following drawings.

DETAILED DESCRIPTION OF PREFERRED EMBODIMENTS

Figure 1:
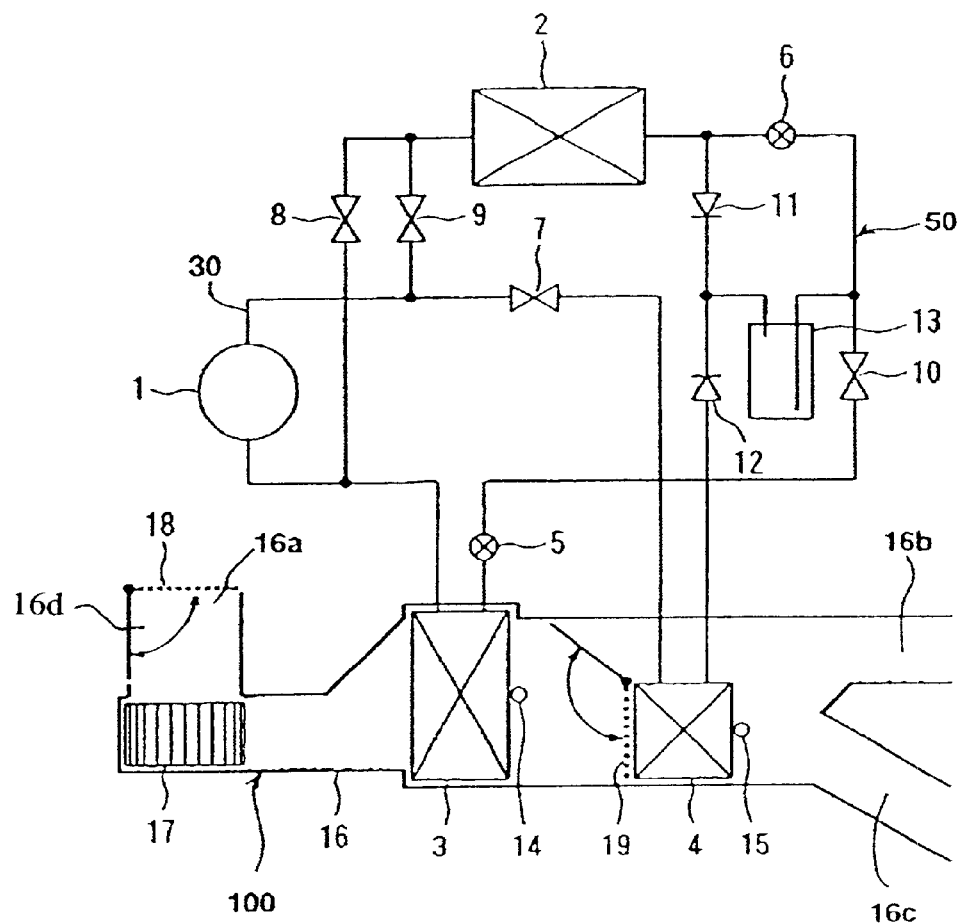
FIG. 1 is a schematic of an air conditioning system according to an embodiment of the present invention.
Figure 2:
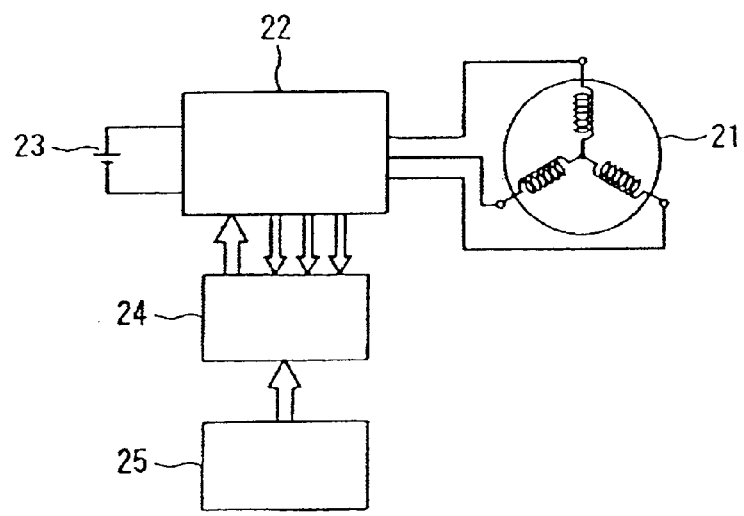
FIG. 2 is a schematic of a control device of the air conditioning system of FIG. 1, for driving a compressor of the air conditioning system, according to an embodiment of the present invention.

FIGS. 1 and 2 depict an air conditioning system 100 for a vehicle according to an embodiment of the present invention. As shown in FIG. 1, air conditioning system 100 comprises a refrigerant circuit 50, e.g., a heat pump-type refrigerant circuit, which includes a compressor 1, e.g., a variable displacement, motor-driven compressor, a fixed displacement, motor-driven compressor, or the like, an external heat exchanger 2; a first internal heat exchanger 3; a second internal heat exchanger 4; a first expansion valve 5; a second expansion valve 6; a first electromagnetic valve 7; a second electromagnetic valve 8; a third electromagnetic valve 9; a fourth electromagnetic valve 10; a first check valve 11; a second check valve 12; and a receiver 13. Moreover, each of these components may be connected via a refrigerant pipe 30.

Air conditioning system 100 also comprises a duct 16 within which a first thermo-sensor 14, a.second thermo-sensor 15, a blower 17, a first damper 18, and a second damper 19 are disposed. Air intake ports 16a and 16d are formed at one end of duct 16, while a first auxiliary duct 16b and a second auxiliary duct 16c are formed at another end of duct 16. Moreover, air intake ports 16a and 16d communicate with a respective one of an exterior space, e.g., a space outside of a passenger compartment of a vehicle, and an interior space, e.g., a passenger compartment of a vehicle. First damper 18 is positioned with respect to air intake ports 16a and 16d, so that damper 18 may pivot to open and close, completely or partially, a respective one of air intake ports 16a and 16d, so that outside air, recirculated passenger compartment air, or both, may be selectively drawn into duct 16 through one or both of air intake ports 16a and 16d. Blower 17, which is positioned adjacent to air intake ports 16a and 16d draws air through air intake ports 16a and 16d and forces the air through duct 16, so that the air may exit duct 16 through the first auxiliary duct 16b, the second auxiliary duct 16c, or both. First internal heat exchanger 3 is positioned within duct 16 at a location downstream of blower 17. Further, first internal heat exchanger 3 may occupy all or substantially all of the cross-sectional area of duct 16. Second internal heat exchanger 4 is positioned within duct 16 at a location downstream of first internal heat exchanger 3. Second internal heat exchanger 4 occupies about one-half of the cross-sectional area of duct 16. Second damper 19, which is associated with second internal heat exchanger 4, is positioned immediately upstream of second internal heat exchanger 4 to control a flow of air through second internal heat exchanger 4. Second damper 19 pivots, so that the flow of air passing through second internal heat exchanger 4 is continuously regulated. At a location downstream of second internal heat exchanger 4, duct 16 branches into first and second auxiliary ducts 16b and 16c. First auxiliary duct 16b may direct air discharged from duct 16 to a front windshield (not shown) of a vehicle. Second auxiliary duct 16c may direct air discharged from duct 16 to a front lower portion of a passenger compartment (not shown) of the vehicle. First thermo-sensor 14, which is positioned at a downstream side of first internal heat exchanger 3, senses a temperature of air flowing out of first internal heat exchanger 3. Second thermo-sensor 15, which is positioned at a downstream side of second internal heat exchanger 4, senses a temperature of air flowing out of second internal heat exchanger 4.

Air conditioning system 100 further comprises a control device, shown in FIG. 2, for regulating a rotational speed of an electric motor 21 that drives compressor 1, thereby enabling the control device to control a rotational speed of compressor 1. The control device, which regulates the rotational speed of the electric motor 21, e.g., the rotational speed of a drive shaft of the electric motor 21, for driving compressor 1, e.g., a drive shaft of compressor 1, at a desired rotational speed, comprises an inverter 22 including a plurality of switching elements, e.g., transistors or the like, a subcontrol circuit 24, and a main control circuit 25. Electric motor 21 for driving compressor 1 may be a three-phase, direct current electric motor. A direct current, electric power source 23 for driving electric motor 21 is connected with inverter 22. Based on detected signals received from first and second thermo-sensors 14 and 15, main control circuit 25 transmits a rotational speed command signal that is proportionate to a target rotational speed of the drive shaft of compressor 1, based on an air conditioning load. Subcontrol circuit 24 sends a switching element drive signal to inverter 22 based on the rotational speed command signal. Consequently, subcontrol circuit 24 receives signals indicative of an electric current and a rotational speed of the drive shaft of electric motor 21 from inverter 22, and controls the rotational speed of the drive shaft of electric motor 21, so that compressor 1, the rotational speed of the drive shaft of which is proportionate to the rotational speed of the drive shaft of electric motor 21, reaches the target rotational speed. Moreover, inverter 22 transmits signals indicative of a voltage of power source 23 to subcontrol circuit 24.

Referring again to FIG. 1, operation of air conditioning system 100 is described. Air conditioning system 100 may operate in a number of different modes, e.g., a cooling mode, a cooling-dehumidifying mode, a heating mode, and a heating-dehumidifying mode. The different modes of operation of air conditioning system 100 may be selected by selectively opening and closing electromagnetic valves 7–10. Moreover, in each mode of operation, the rotational speed of the drive shaft of compressor 1 is variably controlled by controlling the rotational speed of the drive shaft of electric motor 21, in response to an air conditioning load. By controlling the rotational speed of the drive shaft of compressor 1, e.g., to reach a target rotational speed, the control device may adjust a rate of cooling, or heating, or both, of the passenger compartment of the vehicle.

In the cooling mode, first and second electromagnetic valves 7 and 8 are closed, and third and fourth electromagnetic valves 9 and 10 are open. Refrigerant flows from compressor 1 to external heat exchanger 2 via third electromagnetic valve 9 and further flows to first internal heat exchanger 3 via first check valve 11, receiver 13, fourth electromagnetic valve 10, and first expansion valve 5. Subsequently, the refrigerant returns to compressor 1 to complete the cycle. In the cooling mode, external heat exchanger 2 operates as a condenser, e.g., as a heating source, while first internal heat exchanger 3 operates as an evaporator, e.g., as a cooling source. Therefore, as air flows through duct 16, the air is cooled as it passes through first internal heat exchanger 3. Moreover, second damper 19 is positioned as indicated by the dashed line in FIG. 1, i.e., positioned to block a passage through second internal heat exchanger 4. Consequently, air cooled by first internal heat exchanger 3 entirely bypasses second internal heat exchanger 4. The air that is cooled by first internal heat exchanger 3 may be directed through first auxiliary duct 16b or second auxiliary duct 16c, or both, and against the front windshield, the front lower portion of the passenger compartment of the vehicle, or both. An electric signal representing the temperature of the air sensed by first thermo-sensor 14 at a position immediately downstream of first internal heat exchanger 3 is processed in main control circuit 25. The rotational speed of the drive shaft of compressor 1 may be controlled in response to the received electric signals. By controlling the rotational speed of the drive shaft of compressor 1, the displacement of compressor 1 is controlled, so that the sensed temperature approaches a target temperature.

In the cooling-dehumidifying mode, second electromagnetic valve 8 is closed, and first, third, and fourth electromagnetic valves 7, 9, and 10 are open. A portion of the refrigerant flowing from compressor 1 flows to external heat exchanger 2 via third electromagnetic valve 9, while the remainder of the refrigerant flows to second internal heat exchanger 4 via first electromagnetic valve 7. The refrigerant flowing from external heat exchanger 2 and the refrigerant flowing from second internal heat exchanger 4 combine at receiver 13 via first and second check valves 11 and 12, respectively. The refrigerant then flows to first internal heat exchanger 3 via fourth electromagnetic valve 10 and first expansion valve 5, and returns to compressor 1. In the cooling-dehumidifying mode, external heat exchanger 2 and second internal heat exchanger 4 operate as condensers and heating sources, while first internal heat exchanger 3 functions as an evaporator and a cooling source for air passing through duct 16. Second damper 19 is partially open, i.e., positioned somewhere between an open position depicted by the solid line and a closed position depicted by the dashed line in FIG. 1. The position of second damper 19 is controlled between an open and a closed position based on a temperature sensed by second thermo-sensor 15 immediately downstream of second internal heat exchanger 4 and a target temperature. As air flows through duct 16, the air is cooled by first internal heat exchanger 3. The cooled air flowing from first internal heat exchanger 3 is directed by second damper 19, so that a portion of the air passes through second internal heat exchanger 4 to be heated, while the remainder of the air bypasses second internal heat exchanger 4. The cooled air then combines with the heated air at a position downstream of second internal heat exchanger 4. The combined air, which is cooled and dehumidified, is directed through first auxiliary duct 16b or second auxiliary duct 16c, or both, against the front windshield or the front lower portion of the passenger compartment of the vehicle, or both. An electric signal representing a temperature of the air sensed by first thermo-sensor 14 at the position immediately downstream of first internal heat exchanger 3 is processed in main control circuit 25. The rotational speed of the drive shaft of compressor 1 may be adjusted by the control device, e.g., main control circuit 25, subcontrol circuit 24, in response to the received signals. By controlling the rotational speed of the drive shaft of compressor 1, the displacement of compressor 1 may be controlled, so that the sensed temperature may approach a target temperature.

In the heating mode, first and second electromagnetic valves 7 and 8 are open, and third and fourth electromagnetic valves 9 and 10 are closed. The refrigerant flowing from compressor 1 flows to second internal heat exchanger 4 via first electromagnetic valve 7, and further flows to external heat exchanger 2 via second check valve 12, receiver 13, and expansion valve 6. The refrigerant flowing out of external heat exchanger 2 returns to compressor 1 via second electromagnetic valve 8. In the beating mode, external heat exchanger 2 operates as an evaporator and a cooling source, while second internal heat exchanger 4 operates as a condenser and as a heating source. As air flows through duct 16, the air passes through first internal heat exchanger 3 without an occurrence of a heat exchange operation. Moreover, second damper 19 is positioned as indicated by the solid line in FIG. 1, i.e., fully open, so that air in duct 16 passes entirely through second internal heat exchanger 4, thereby heating the air. After the air passes through second internal heat exchanger 4, the heated air is directed through first auxiliary duct 16b, or second auxiliary duct 16c, or both, and against the front windshield or the front lower portion of the passenger compartment of the vehicle, or both. An electric signal representing a temperature of the air sensed by second thermo-sensor 15 at a position immediately downstream of second internal heat exchanger 4 is processed in main control circuit 25. The rotational speed of the drive shaft of compressor 1 may be controlled by the control device, e.g., main control circuit 25, subcontrol circuit 24, in response to the received signals. By controlling the rotational speed of the drive shaft of compressor 1, the displacement of compressor 1 may be controlled, so that the sensed temperature approaches a target temperature.

In the heating-dehumidifying mode, third electromagnetic valve 9 is closed, and first, second, and fourth electromagnetic valve 7, 8, and 10 are open. As a result, the refrigerant flowing from compressor 1 flows to second internal heat exchanger 4 via first electromagnetic valve 7, and further flows to receiver 13 via second check valve 12. The refrigerant flowing from receiver 13 diverges, such that a portion of the refrigerant flows to external heat exchanger 2 via second.expansion valve 6, and another portion flows to first internal heat exchanger 3 via fourth electromagnetic valve 10 and first expansion valve 5. The refrigerant flowing from first internal heat exchanger 3 combines with the refrigerant flowing from external heat exchanger 2 via second electromagnetic valve 8, and returns to compressor 1. In the heating-dehumidifying mode, external heat exchanger 2 and first internal heat exchanger 3 operate as evaporators, e.g., as cooling sources, while second internal heat exchanger 4 operates as a condenser, e.g., as a heating source. Second damper 19 is maintained at the position indicated by the solid line in FIG. 1, i.e., fully open. As air flows through duct 16, the air is cooled by first internal heat exchanger 3. The cooled air flowing from first internal heat exchanger 3 passes entirely through second internal heat exchanger 4, where it is heated. After passing through second internal heat exchanger 4, the heated air is directed through first auxiliary duct 16b or second auxiliary duct 16c, or both, to the front windshield or the front lower portion of the passenger compartment of the vehicle, or both. An electric signal representing a temperature of the air sensed by second thermo-sensor 15 at a position immediately downstream of second internal heat exchanger 4 is processed in main control circuit 25. The rotational speed of the drive shaft of compressor 1 may be controlled by the control device, e.g., main control circuit 25, subcontrol circuit 24, in response to the received electrical signals. By controlling the rotational speed of the drive shaft of compressor 1, the displacement of compressor 1 may be controlled, so that the sensed temperature approaches a target temperature.

Figure 3:
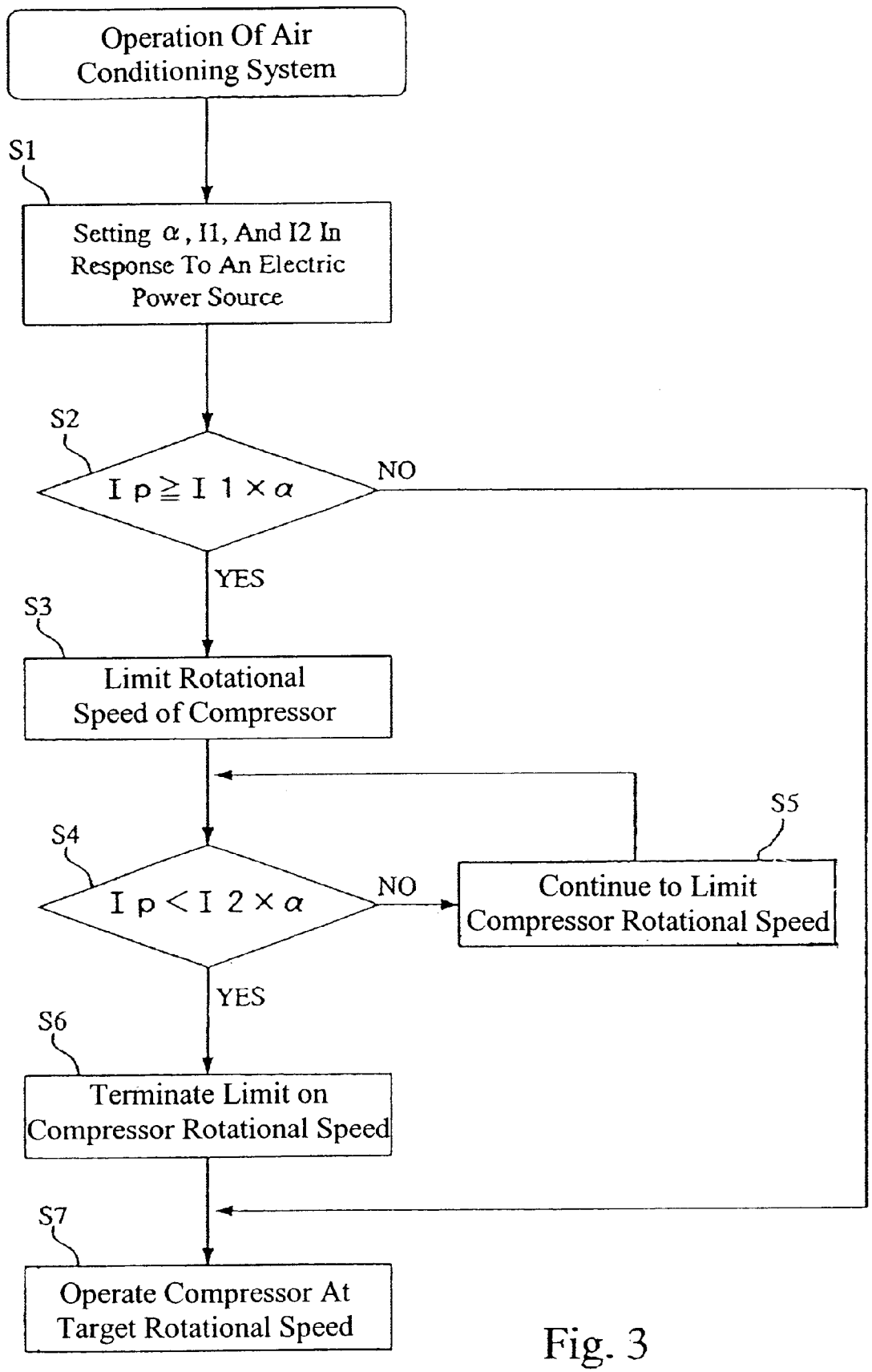
FIG. 3 is a flow chart of an operation of the air conditioning system depicted in FIGS. 1 and 2, according to an embodiment of the present invention.

Referring to FIG. 3, operation of a control device for regulating a rotational speed of compressor 1, e.g., a rotational speed of a drive shaft of compressor 1, upon activation of air conditioning system 100 is described. For example, when compressor 1 is activated, e.g., in the heating mode, subcontrol circuit 24 detects a condition of electric power source 23 based on voltage information received from inverter 22. Then, subcontrol circuit 24 sets a coefficient $\alpha 0$ in response to the detected condition of electric power source 23. Moreover, subcontrol circuit 24 sets a first standard electric current value I1 and a second standard electric current value I2 (step S1). The coefficient $\alpha$, first standard electric current value I1, and second standard electric current value I2 may be selected from predetermined values, e.g., from values determined by testing conducted beforehand, or they may be calculated based on voltage information received from inverter 22, or a combination thereof.

Next, subcontrol circuit 24 detects, e.g., receives a signal indicative of, an electric current value Ip flowing at electric motor 21 at a start of operation of compressor 1. Subcontrol circuit 24 then determines whether the electric current value Ip is greater than or equal to the first standard electric current value I1 multiplied by the coefficient $\alpha$. This calculation enables subcontrol circuit 24 to determine whether or not liquid compression is occurring at compressor 1 based on the detected electric current value Ip flowing at electric motor 21 at the start of operation of compressor 1 (step S2). The value obtained by multiplying the first standard electric current value I1 by the coefficient $\alpha$ provides a first threshold value against which the electric current value Ip flowing at electric motor 21 may be compared to determine whether or not liquid compression is occurring in compressor 1 at the start of compressor operation. If the electric current value Ip is less than the value of the first standard electric current value I1 multiplied by the coefficient $\alpha$ at step S2, subcontrol circuit 24 determines that liquid compression is not occurring at compressor 1, and subcontrol circuit 24 controls operation of the drive shaft of electric motor 21, so that compressor 1, e.g., the drive shaft of compressor 1, operates at the target rotational speed Rt, which is determined in response to the current air conditioning load (step S7).

If the detected electric current value Ip is greater than or equal to the first standard electric current value I1 multiplied by the coefficient $\alpha$, subcontrol circuit 24 concludes that liquid compression is occurring at compressor 1. Once subcontrol circuit 24 determines that liquid compression is occurring at compressor 1, e.g., once subcontrol circuit 24 determines that the electric current value Ip flowing at electric motor 21 at a start of compressor operation is greater than or equal to the value of the first standard electric current value I1 multiplied by the coefficient $\alpha$, subcontrol circuit 24 starts a control subroutine to limit the rotational speed of the drive shaft of compressor 1 (step S3). More particularly, if the electric current value Ip flowing at electric motor 21 at a start of compressor operation is greater than or equal to the value of the first standard electric current value I1 multiplied by coefficient $\alpha$, compressor 1, e.g., the drive shaft of compressor 1, is operated at an activated rotational speed Rs that is less than a target rotational speed Rt determined in response to an air conditioning load. The activated rotational speed Rs may be set at a predetermined value, e.g., a value determined by testing beforehand or the activated rotational speed Rs may be calculated based on the target rotational speed Rt, or a combination thereof.

Once subcontrol circuit 24 starts the control subroutine to limit the rotational speed of the drive shaft of compressor 1, subcontrol circuit 24 detects the electric current value Ip flowing at electric motor 21 to determine whether or not liquid compression is still occurring in compressor 1. More particularly, subcontrol circuit 24 determines whether the detected electric current value Ip is greater than or equal to the second standard electric current value I2 multiplied by the coefficient $\alpha$ (step S4). The value of the second standard electric current value I2 multiplied by the coefficient $\alpha$ serves as a second threshold for determining whether or not liquid compression is occurring during operation of the control subroutine to limit the rotational speed of the drive shaft of compressor 1. If the electric current value Ip is greater than or equal to the value of the second standard electric current I2 multiplied by the coefficient $\alpha$, subcontrol circuit 24 determines that liquid compression is occurring at compressor 1, and subcontrol circuit 24 continues the control subroutine to limit the rotational speed of the drive shaft of compressor 1 (step S5).

If the subcontrol circuit 24 determines that the electric current value Ip is less than the second standard electric current value I2 multiplied by the coefficient $\alpha$ at step S4, subcontrol circuit 24 concludes that liquid compression is not occurring, and subcontrol circuit 24 terminates the control subroutine to limit the rotational speed of the drive shaft of compressor 1 (step S6). Thereafter, subcontrol circuit 24 controls a rotational speed of the drive shaft of electric motor 31, so that the drive shaft of compressor 1 is operated at the target rotational speed Rt, which is determined in response to a current air conditioning load (step S7).

Thus, according to an embodiment of the present invention, subcontrol circuit 24 determines whether liquid compression is occurring at compressor 1 by detecting an electric current value Ip flowing at electric motor 21 at a start of compressor operation and comparing the electric current value Ip to a first standard electric value I1 multiplied by a coefficient $\alpha$. If subcontrol circuit 24 determines that liquid compression is not occurring at compressor 1, subcontrol circuit 24 operates compressor 1, e.g., a drive shaft of compressor 1, at the target rotational speed Rt (step S7). As a result, any unnecessary limitation of the rotational speed of the drive shaft of compressor 1 at the activation of compressor operation may be effectively reduced or eliminated.

When subcontrol circuit 24 determines that liquid compression is occurring during compressor operation, subcontrol circuit 24 limits the rotational speed of the drive shaft of compressor 1 (step S3), so that compressor 1 is operated at an activated rotational speed Rs that is lower than the target rotational speed Rt. As a result, damage to compressor 1, or to the components in the refrigerant cycle, or both, due to the liquid compression of refrigerant may be reduced or eliminated. Moreover, subcontrol circuit 24 determines whether liquid compression continues to occur in compressor 1 by detecting the electric current value Ip flowing at electric motor 21 after subcontrol circuit 24 limits the rotational speed of the drive shaft of compressor 1. If subcontrol circuit 24 determines that liquid compression is not occurring at compressor 1, subcontrol circuit 24 stops limiting the rotational speed of the drive shaft of compressor 1 (step S6), and increases the rotational speed of the drive shaft of compressor 1, so that the drive shaft of compressor 1 operates at a target rotational speed Rt (step S7). As a result, a prompt increase of the temperature of air passing through duct 16 during the heating mode of operation and the heating-dehumidifying mode of operation may be achieved.

While the invention has been described in connection with preferred embodiments, it will be understood by those of ordinary skill in the art that other variations and modifications of the preferred embodiments described above may be made without departing from the scope of the invention. Moreover, other embodiments of the present invention will be apparent to those of ordinary skill in the art from a consideration of the specification or a practice of the invention disclosed herein, or both.

What is claimed is:

1. A vehicle air conditioning system comprising:

a compressor;

an electric motor for driving said compressor;

means for variably controlling a rotational speed of a drive shaft of said compressor based on a target rotational speed of said drive shaft of said compressor;

means for limiting said rotational speed of said drive shaft of said compressor to less than said target rotational speed when a first value of a current detected at said electric motor is greater than or equal to a first predetermined value; and means for terminating said limiting of said rotational speed of said drive shaft of said compressor when a second value of said detected current is less than a second predetermined value.

2. The air conditioning system of claim 1, wherein said means for variably controlling said rotational speed of said compressor drive shaft comprises an electric circuit including an inverter and further wherein a value of said current detected at said electric motor is determined based signals indicative of an electric current received from said inverter.

3. The air conditioning system of claim 1, wherein said means for limiting said rotational speed of drive shaft of said compressor comprises an electric circuit.

4. The air conditioning system of claim 1, wherein said means for terminating said limiting of said rotational speed of said compressor comprises an electric circuit.

5. The air conditioning system of claim 4, wherein said electric circuit further comprises a subcontrol circuit for regulating said rotational speed of said drive shaft of said compressor, so that said compressor drive shaft reaches said target rotational speed.

6. A method of controlling an air conditioning system comprising a motor-driven compressor, the method comprising the steps of:

detecting an electric current at an electric motor;

comparing a first value of said detected current to a first predetermined value; and limiting a rotational speed of a drive shaft of said compressor if said first value is greater than or equal to said first predetermined value.

7. The method of claim 6, further comprising the step of:

operating said drive shaft of said compressor at a target rotational speed if said first value is less than said first predetermined value.

8. The method of claim 6, further comprising the steps of:

comparing a second value of said detected current to a second predetermined value; and continuing to limit said rotational speed of said drive shaft of said compressor if said second value is greater than or equal to said second predetermined value.

9. The method of claim 8, further comprising the steps of:

terminating the step of limiting said rotational speed of said compressor when said detected electric current value is less than said second predetermined value; and increasing said rotational speed of said compressor until said drive shaft of said compressor reaches a target rotational speed.

10. An air conditioning system comprising:

a compressor;

an electric motor for driving said compressor; and a control device for regulating a rotational speed of said electric motor, so that a drive shaft of said compressor rotates at a target rotational speed based on an air conditioning load, wherein said control device detects a first value of an electric current at said electric motor and limits said rotational speed of said electric motor if said first value is greater than or equal to a first predetermined value, so that said rotational speed of said drive shaft of said compressor remains below said target rotational speed.

11. The air conditioning system of claim 10, wherein said control device detects a second value of an electric current at said electric motor and further wherein said control device continues to limit said rotational speed of said motor if said second value is greater than or equal to a second predetermined value.

12. The air conditioning system of claim 10, wherein said control device detects a second value of an electric current at said electric motor and stops limiting said rotational speed of said electric motor if said second value is less than a second predetermined value.

13. The air conditioning system of claim 12, further wherein said control device increases said rotational speed of said electric motor, so that said electric motor drives said drive shaft of said compressor at said target rotational speed, after said control device stops limiting said rotational speed of said electric motor.

14. The air conditioning system of claim 10, wherein said control device further comprises:

a main control circuit for transmitting a rotational speed command signal corresponding to said target rotational speed of said drive shaft of said compressor; and a subcontrol circuit for receiving said rotational speed command signal and transmitting at least one switching element signal to an inverter for controlling said rotational speed of said electric motor, so that said compressor drive shaft reaches said target rotational speed.

15. The air conditioning system of claim 10, wherein said control device increases said rotational speed of said electric motor, if said first value is less than said first predetermined value, so that said drive shaft of said compressor reaches said target rotational speed.

* * * * *